United States Patent [19]

Ajayan et al.

[11] Patent Number: 5,457,343
[45] Date of Patent: Oct. 10, 1995

[54] CARBON NANOTUBULE ENCLOSING A FOREIGN MATERIAL

[75] Inventors: Pulickel M. Ajayan; Sumio Iijima, both of Tokyo, Japan

[73] Assignee: NEC Corporation, Tokyo, Japan

[21] Appl. No.: 170,806

[22] Filed: Dec. 21, 1993

[30] Foreign Application Priority Data

Dec. 22, 1992 [JP] Japan .................................. 4-341747

[51] Int. Cl.$^6$ ......................... H01L 29/41; H01L 29/43; D01F 9/12
[52] U.S. Cl. ......................... 257/734; 257/741; 257/746; 423/447.2; 423/DIG. 39; 423/DIG. 40
[58] Field of Search ........................... 257/734, 741–742, 257/1–4, 746; 422/312; 423/447.2, DIG. 39, DIG. 40; 428/367, 371, 376, 377

[56] References Cited

U.S. PATENT DOCUMENTS 5,346,683   9/1994   Green et al. ........................ 423/447.2

OTHER PUBLICATIONS

Pederson et al., Nanocapillarity in Fullerene Tubes, Phys. Rev. Lett. vol. 69, No. 18, Nov. 2, 1992 pp. 2689–2692.
Ajayan et al., Capillarity–Induced Filling of Carbon Nanotubes, Nature, vol. 361, Jan. 28, 1993, pp. 333–334.
Dunlap, B. I., Connecting Carbon Tubules, Phys. Rev. B, vol. 46, No. 3, Jul. 15, 1992, pp. 1933–1936.
Ajayan et al., Opening Carbon Nanotubes with Oxygen and Implications for Filling, Nature, vol. 362, Apr. 8, 1993, pp. 522–525.
Yi et al., Atomic Structure and Doping of Microtubules, Phys. Rev. B, vol. 47, No. 3, Jan. 15, 1993, pp. 1708–1711.
Tsang et al., Thinning and Opening of Carbon Nanotubes by Oxidation Using Carbon Dioxide, Nature, vol. 362, Apr. 8, 1993, pp. 520–522.
By S. Iijima, "Helical Microtubules of graphitic carbon", Letters to Nature, Nov. 7, 1991, vol. 354, pp. 56–58.
By N. Hamada et al., "New One–Dimensional Conductors: Graphitic Microtubules", Physical Review Letters, Mar. 9, 1992, vol. 68, No. 10, pp. 1579–1581.
By S. Iijima et al., "Pentagons, heptagons and negative curvature in graphite microtubule growth", Nature–International Weekly Journal of Science, Apr. 30, 1992, vol. 356, No. 6372, pp. 776–778.

*Primary Examiner*—William Mintel
*Assistant Examiner*—Peter Toby Brown
*Attorney, Agent, or Firm*—Young & Thompson

[57] ABSTRACT

The invention provides a nanometer sized carbon tubule enclosing a foreign material except for carbon. The carbon tubule comprises a plurality of tubular graphite monoatomic sheets coaxially arranged. The foreign material is introduced through a top portion of the carbon tubule. The introduction of the foreign material is accomplished after forming an opening at the top portion of the carbon tubule either by contacting the foreign material with the top portion of the carbon tubule together with a heat treatment or by an evaporation of the foreign material on the top portion of the carbon tubule together with the heat treatment. The foreign material is introduced only in a center hollow space defined by an internal surface of the most inner tubular graphite monoatomic sheet.

2 Claims, 2 Drawing Sheets

CARBON NANOTUBULE ENCLOSING A FOREIGN MATERIAL

BACKGROUND OF THE INVENTION

The invention relates to a carbon nanotubule enclosing a foreign material applicable as a new material in electrical and chemical fields and the like.

A carbon nanotubule is known as a microscopic fibrillar tube having a nanometer size in diameter. The carbon nanotubule comprises a single or coaxial monoatomic sheets cylindrically bent around a center axis of the tubule and a cylindrical center space or a cylindrical hollow defined by the sheet. The monoatomic sheet comprises a graphite carbon monoatomic sheet. Such carbon tubule is such an extremely slender carbon fibril as having a nanometer size in diameter. The individual monoatomic sheets are coaxially arranged to be separated by a distance in the radial direction. The micron-sized carbon fibril has been well known in the prior art. The nanometer sized carbon fibril has first been reported in 1991 Nature, Vol. 354, pp. 56–58, and thus received a great attention through the world as having applicabilities to one-dimensional conductor, catalyst or super reinforced structures and various fields. Each of the coaxial carbon tubules was tested to clear electronic properties thereof, which are reported in 1992 Physical Review Letter, Vol. 68, pp. 1579–1581. Electronic properties of the carbon nanotubule depend upon the diameter and a pitch of a helical structure thereof and thus differ from various materials such as metals and semiconductors. The difference in the electrical properties of the carbon nanotubule also appears between semiconductors having various energy band gaps. This makes the carbon nanotubule very attractive.

As described above, carbon nanotubules have received a great attention as a new material applicable to various industries. It has occasionally been considered to use the carbon nanotubule as an absorbent or a complex. It, however, seems that it has been neither considered nor known to use the carbon nanotubule as an enclosure for foreign materials as a novel material or utilize a carbon nanotubule involving a foreign material. Of course, it seems that it has never been known in the art how to introduce any foreign material into such nanometer sized tubules to form the carbon nanotubule involving any foreign material.

OBJECTS OF THE INVENTION

Accordingly, it is a primary object of the present invention to provide a new material comprising a carbon tubule having a nanometer size in diameter enclosing a foreign material.

It is a further object of the present invention to provide a carbon tubule having a nanometer size in diameter enclosing a metal.

It is a further object of the present invention to provide a carbon tubule having a nanometer size in diameter enclosing a semiconductor.

It is a still further object of the present invention to provide a carbon tubule having a nanometer size in diameter enclosing a superconductor.

It is yet a further object of the present invention to provide a carbon tubule having a nanometer size in diameter enclosing a magnetic material.

It is an additional object of the present invention to provide a carbon tubule having a nanometer size in diameter enclosing an alkali metal.

SUMMARY OF THE INVENTION

The above and other objects, features and advantages of the present invention will be apparent from the following descriptions.

The present invention provides a nanometer sized carbon tubule enclosing a foreign material except for carbon. The carbon tubule comprises a plurality of tubular graphite monoatomic sheets coaxially arranged. The foreign material is introduced through a top portion of the carbon tubule. The introduction of the foreign material is accomplished after forming an opening at the top portion of the carbon tubule by contacting the foreign material with the top portion of the carbon tubule together with a heat treatment. Alternatively, the formation of the opening at the top portion of the carbon tubule may be accomplished by an evaporation of the foreign material on the top portion of the carbon tubule together with the heat treatment. The foreign material is introduced only in a center hollow space defined by an internal surface of the most inner tubular graphite monoatomic sheet.

BRIEF DESCRIPTION OF THE DRAWINGS

Preferred embodiments of the present invention will be described in detail with reference to the accompanying drawings.

EMBODIMENTS

Figure 1:
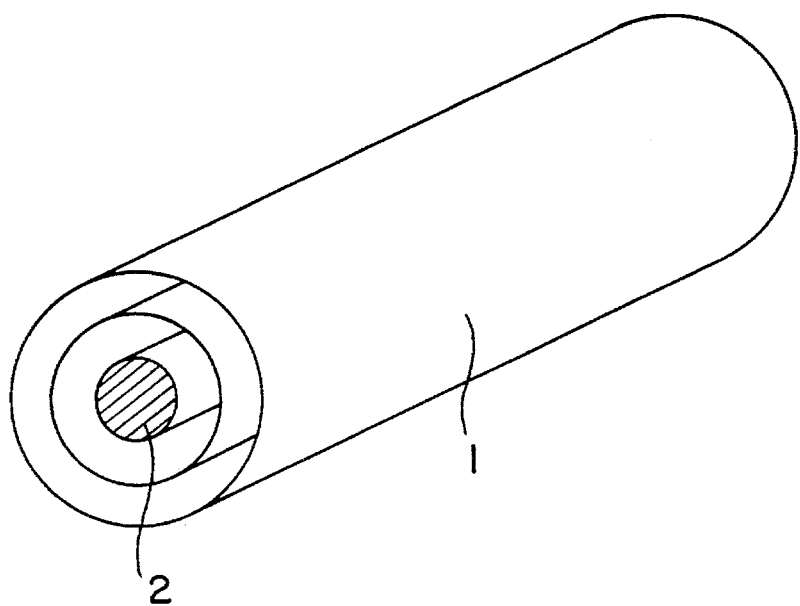
FIG. 1 is a perspective view illustrative of a novel carbon nanotubule enclosing a foreign material in its center hollow in a preferred embodiment according to the present invention.

The present invention provides a carbon tubule having a nanometer sized diameter enclosing a foreign material in its center hollow. The nanometer sized carbon tubule according to the present invention may comprise a single cylinder of a graphite carbon monoatomic sheet which is cylindrically bent around a center axis of the tubule and a centered cylindrical hollow space defined by the graphite carbon monoatomic sheet. Alternatively, the nanometer sized carbon tubule may also comprise a plurality of cylinders of the graphite carbon monoatomic sheets which are coaxially positioned around the center axis of the tubule in which the graphite carbon monoatomic sheets are separated from each other by a predetermined distance in a radial direction.

The nanometer sized carbon tubule according to the present invention encloses various foreign materials different from carbon such as metals, superconductors, magnetic materials organic molecules, gases and alkali metals. The nanometer sized carbon tubule enclosing the foreign material had never been known nor conceived in the art, unless the present invention was conceived by the inventors of the present invention. It had been neither known nor conceived in the prior arts to introduce the foreign material into the nanometer sized carbon tubule through its top portion. According to the present invention, the foreign material is introduced through the top portion of the tubule into the cylindrical center hollow thereof. The top portion of the nanometer sized carbon tubule is normally closed. It is thus necessary to form an opening at the top of the nanometer sized carbon tubule so that the foreign material is introduced trough the opening at the top into the center hollow of the tubule. In order to form the opening at the top of the nanometer sized carbon tubule, the top of the nanometer sized carbon tubule may be subjected to a selective reaction with the foreign material in a melted state under predetermined conditions to break the top portion of the nanometer sized carbon tubule so that an opening is formed at the top portion of the tubule. When the foreign material has a high temperature melting point, it may be difficult to prepare the melted foreign material for the selective reaction to the top portion of the carbon tubule. Gaseous compounds such as hydride are useful to introduce the foreign material having a relatively high melting point into tubule through its top portion.

As described below, various metals, superconductors, magnetic materials organic molecules, gases and alkali metals are useful as the foreign material to be introduced into the nanometer sized carbon tubule. As metals, lead, tin, copper, indium, gallium and mercury are useful. As semiconductors, silicon, germanium, gallium fluoride, zinc selenide and zinc sulfide are useful. As magnetic materials, samarium, gadolinium, lanthanum, iron, cobalt and nickel are useful. As organic molecules, organic molecular semiconductors such as naphthalene, anthracene, phenanthrene, pyrene and pyridene and organic coloring molecules such as cyanine dyestuffs and beta carotene are useful. As gases, hydrogen fluoride, methane and ethane and the like are useful. As alkali metals, lithium, sodium, potassium, rubidium and cesium are useful.

Useful gaseous compounds may be silane, disilane, germane, dichrorosilane, arsine, phosphide, hydrogen selenide, hydrogen sulfide, triethyl gallium, dimethyl zinc and hexafluorotungsten and the like. Desired hydride, chloride, fluoride, alkoxy compounds, alkyl compounds and the mixture thereof are also useful as the gaseous compounds.

The top of the normal nanometer sized carbon tubule is closed as reported in 1992, "Nature", vol. 356, pp. 776–778. It is therefore essential to form an opening at the top portion of the nanometer sized carbon tubule so as to introduce the foreign material into the hollow of the tubule through the opening. Useful methods of forming the opening at the top of the nanometer sized carbon tubule may be as follows. The top of the nanometer sized carbon tubule may be exposed to a reactive gas to be selectively etched by the same for the formation of the opening at the top of the tubule. Alternatively, the top of the nanometer sized carbon tubule may be applied with such a high voltage as to cause a corona discharge which breaks the top of the tubule for the formation of the opening at the top of the tubule. Further, the top of the nanometer sized carbon tubule may also be exposed to a reactive liquid to be selectively etched by the same for the formation of the opening at the top of the tubule.

According to the present invention, the introduction of the foreign material into the tubule may be accomplished either simultaneously or after the formation of the opening at the top of the carbon tubule. The introduction of the foreign material into the carbon tubule may be implemented by an evaporation of the foreign material on the top of the carbon tubule and a subsequent heat treatment. Alternatively, the introduction of the foreign material into the carbon tubule may be implemented by contacting the top of the carbon tubule with the gaseous compound including the foreign material.

In addition, it is preferable that a light is irradiated when the top of the carbon tubule is reacted with the gaseous compound including the foreign material to be introduced into the carbon tubule thereby improving a facility of the forming the opening at the top of the carbon tubule.

As described above, the nanometer sized carbon tubule according to the present invention may comprise a plurality of coaxial graphite carbon monoatomic cylindrical sheets. The most inner carbon monoatomic cylindrical sheet is a few angstroms or more in diameter and defines the center cylinder hollow space to be filled with the foreign material such as the metals, superconductors, semiconductors, magnetic materials, organic molecules and gases. The nanometer sized carbon tubule enclosing the foreign material as mentioned above may serve as a new complex material which possesses not only excellent properties of the tubule but also properties of the complex material of both the carbon tubule and the foreign material as well as properties of the foreign material only. Those allow a much more wide applicability of the tubule. Excellent properties of the nanometer sized carbon tubule involving the foreign material are caused by its one-dimensional structure, a completeness in its structure and its shape, for which reason the carbon tubule according to the present invention has infinite applicabilities as various novel materials. For example, the nanometer sized carbon tubule involving the foreign material is available as an essential material for a quantum device utilizing quantum size effects which first appear remarkably in nanometer scale. Further, for example, the nanometer sized carbon tubule is available as its structural completeness for a device exhibiting a high speed performance or possessing a high mobility of electrons. Namely, the carbon tubule according to the present invention are being placed in expectation as electronics materials in a new generation.

The description will be directed to the atomic structure of the carbon tubule. The nanometer sized carbon tubule comprises the top portion which comprises five membered rings or pentagonal rings of carbon atoms and the side wall which comprises six membered rings or hexagon rings of carbon atoms. The five membered rings or the pentagonal rings constituting the top of the carbon tubule are reactive with the foreign material as they tend to be broken when contacted with the foreign material. In contrast to the incompleteness in the atomic structure of the pentagon, the six membered rings atomic structure or the hexagonal atomic structure has the completeness in the atomic structure so as not to be active nor reactive with any foreign material. Thus, the hexagonal atomic structure is not broken even when contacted with any foreign material. It is therefore understood that when the carbon tubule is placed in contact with the foreign material, the carbon tubule is broken but only at the top portion thereof having the pentagonal atomic structure of carbon and the entire side wall of the tubule is not broken as having the hexagonal atomic structure of carbon. For those reasons, the selective reaction to etch only the top portion of the carbon tubule except for the side wall thereof are achievable thereby resulting in the formation of the opening at the top of the carbon tubule for the subsequent introduction of the foreign material through the opening into the carbon tubule.

As described above, the nanometer sized carbon tubule according to the present invention may comprise a plurality of coaxial and cylindrical graphite carbon monoatomic sheets separated by the cylindrical space or spaces defined between the adjacent inner and outer monoatomic sheets. It is difficult to intercalate or introduce the foreign material into the each space defined between the adjacent inner and outer monoatomic sheets. In normal flat graphite carbon monoatomic sheets, a space sandwiched between the adjacent flat monoatomic sheets exists in two dimensional space. The surfaces of the adjacent two flat monoatomic sheets are bonded to each other through van der Waals force and further are movable freely but slightly in a direction vertical to the surfaces of the flat sheets. Such freedom in the movement in the vertical direction to the sheets allows the introduction of the foreign material into the flat space sandwiched between the flat monoatomic sheets to form any intercalation compound. In contrast, the carbon tubule according to the present invention comprises a plurality of the cylindrical carbon monoatomic sheets, each of which has a structural constancy and is not movable. The distance between the adjacent coaxial and cylindrical monoatomic sheets is constant and not variable. The distance between the adjacent coaxial and cylindrical monoatomic sheets is so extremely narrow as not permitting the introduction nor intercalation of any foreign material into the space defined between the adjacent coaxial and cylindrical monoatomic sheets. For those reasons, it is difficult for the nanometer sized carbon tubule to intercalate any foreign material into the interlayer space defined between the adjacent coaxial and cylindrical monoatomic sheets. As described above, the most inner cylindrical graphite carbon monoatomic sheet defines the cylindrical hollow space positioned along the center axis. The center hollow space in the carbon tubule has such a diameter as permitting the introduction of the foreign material therein. Accordingly, the nanometer sized carbon tubule according to the present invention encloses the foreign material in its center hollow space only except for any interlayer space between the adjacent inner and outer coaxial cylindrical graphite carbon monoatomic sheets.

The description will be directed back to the method of forming the nanometer sized carbon tubule enclosing the foreign material according to the present invention. It has been known in the art, to which the invention pertains, how to form the nanometer sized carbon tubule enclosing no foreign material, which comprises a plurality of the coaxial and cylindrical graphite carbon monoatmic sheets. Thus, the carbon tubule having the nanometer sized diameter, which comprises a plurality of the coaxial and cylindrical graphite carbon monoatomic sheets may be formed according to the processes known in the art where the top portion of the tubule is closed. The top portion of the carbon tubule is then subjected to an evaporation of a suitable amount of the foreign material. The top portion of the carbon tubule is further subjected to a heat treatment at a temperature over a melting point of the foreign material under an atmosphere until the top portion of the carbon tubule is broken by the reaction with the foreign material whereby the opening is formed at the top portion of he carbon tubule. The foreign material melted by the heat treatment flows trough the opening at the top portion into the center hollow space only in the carbon tubule except the interlayer spaces between the monoatomic cylindrical sheets. The introduction of the foreign material melted into the center hollow space of the carbon tubule is continued until the center hollow space of the carbon tubule is filled with the melted foreign material. After completion of the introduction of the melted foreign material into the center hollow space of the carbon tubule, the broken top portion or the opening is restored and closed by the known process in the art.

The nanometer sized carbon tubule according to the present invention is so designed that the center hollow space defined by the most inner cylindrical monoatomic sheet of the carbon tubule has a diameter of approximately 5 angstroms or more. Such diameter of the center hollow space of the carbon tubule permits the introduction of various melted foreign material such as metals, semiconductors, magnetic materials and other materials mentioned above. In view of the applicability of the carbon tubule to various quantum effect devices utilizing the quantum size effects appearing in nanometer size, it is preferable that the center hollow space defined by the most inner cylindrical monoatomic sheet of the carbon tubule has a diameter less than 10 nanometers.

When the introduction of metals as the foreign material into the center hollow space by contacting it with the gaseous compound including the metals, it is preferable to use a hydrogen compound as the gaseous compound as a facility to remove hydrogen molecules from the reaction system in which the hydrogen molecules were produced in the introduction of the foreign material.

It is further preferable to irradiate a light when the top of the carbon tubule is exposed to the gaseous compound including the foreign material as its ability to promote the reaction which breaks the top portion comprising the pentagonal atomic structure. It is preferable that a light having a wavelength in the range of from 200 to 400 nanometers is irradiated on the top of the carbon tubule. It is not preferable to use a light having a wavelength shorter than the above range as the light prevents any damage to the atomic structure of the carbon tubule. It is also not preferable to use a light having a wavelength longer than the above range as the light is unable to promote the reaction of the foreign material with the pentagonal atomic structure of the top portion of the carbon tubule,

EXAMPLE 1

The nanometer sized carbon tubule according to the present invention is prepared in a helium atmosphere of 500 Torr with a discharge at a direct current of 20 V in which carbon sticks of 10 mm and 6 mm in diameter are used as a cathode and an anode respectively, The carbon tubule prepared is placed on a supporting grid substrate for an electron microscope which is placed in a vacuum evaporator, An electron beam evaporation of lead is carried out at an evaporation ratio of 5 angstroms per second so that a lead is evaporated to a thickness of 50 nanometers, The carbon tubule is observed by the electron microscope to confirm that the carbon tubule is adhered on its top and side portions with particles of lead, but no lead exists within the carbon tubule. The supporting grid substrate is subjected to a heat treatment in a furnace at a temperature of 350° C. for 30 minutes in atmosphere. The carbon tubule subjected to the heat treatment is observed by a transmission electron microscope. As shown in FIG. 1, lead 2 is introduced through the top portion of the carbon tubule into the center hollow space of 20 nanometers in a diameter thereby it was confirmed that carbon tubules 1 enclosing the lead 2 were prepared.

EXAMPLE 2

The nanometer sized carbon tubule according to the present invention is prepared in the helium atmosphere of 500 Torr with the discharge at a direct current of 20 V in which carbon sticks of 10 mm and 6 mm in diameter are used as the cathode and the anode respectively. The carbon tubule prepared is placed on the supporting grid substrate for an electron microscope which is placed in the vacuum evaporator. An electron beam evaporation of tin is carried out at an evaporation ratio of 5 angstroms per second so that a tin is evaporated to a thickness of 50 nanometers. The carbon tubule is observed by the electron microscope to confirm that the carbon tubule is adhered on its top and side portions with particles of tin, but no tin exists within the carbon tubule. The supporting grid substrate is subjected to a heat treatment in the furnace at a temperature of 270° C. for 30 minutes in atmosphere. The carbon tubule subjected to the heat treatment is observed by the transmission electron microscope. Tin is introduced through the top portion of the carbon tubule into the center hollow space of 20 nanometers in a diameter whereby it was confirmed that the carbon tubule enclosing the tin were prepared.

EXAMPLE 3

The nanometer sized carbon tubule according to the present invention is prepared in a helium atmosphere of 500 Torr with a discharge at a direct current of 20 V in which carbon sticks of 10 mm and 6 mm in diameter are used as the cathode and the anode respectively. The carbon tubule prepared is placed on the supporting grid substrate for an electron microscope which is placed in the vacuum evaporator. An electron beam evaporation of copper is carried out at an evaporation ratio of 5 angstroms per second so that copper is evaporated to a thickness of 50 nanometers. The carbon tubule is observed by the electron microscope to confirm that the carbon tubule is adhered on its top and side portions with particles of copper, but no copper exists within the carbon tubule. The supporting grid substrate is subjected to a heat treatment in the furnace at a temperature of 1100° C. for 60 minutes in atmosphere. The carbon tubule subjected to the heat treatment is observed by the transmission electron microscope. Copper is introduced through the top portion of the carbon tubule into the center hollow space of 20 nanometers in a diameter whereby it was confirmed that carbon tubule enclosing the copper were prepared.

EXAMPLE 4

The nanometer sized carbon tubule according to the present invention is prepared in a helium atmosphere of 500 Torr with a discharge at a direct current of 20 V in which carbon sticks of 10 mm and 6 mm in diameter are used as the cathode and the anode respectively. The carbon tubule prepared is placed on the supporting grid substrate for an electron microscope which is placed in the vacuum evaporator. An electron beam evaporation of samarium is carried out at an evaporation ratio of 5 angstroms per second so that samarium is evaporated to a thickness of 50 nanometers. The carbon tubule is observed by 1 the electron microscope to confirm that the carbon tubule is adhered on its top and side portions with particles of samarium, but no samarium exists within the carbon tubule. The supporting grid substrate is subjected to a heat treatment in the furnace at a temperature of 1200° C. for 30 minutes in atmosphere. The carbon tubule subjected to the heat treatment is observed by the transmission electron microscope. Samarium is introduced through the top portion the carbon tubule into the center hollow space of 20 nanometers in a diameter whereby it was confirmed that carbon tubule enclosing the samarium were prepared.

EXAMPLE 5

The nanometer sized carbon tubule according to the present invention is prepared in a helium atmosphere of 500 Torr with a discharge at a direct current of 20 V in which carbon sticks of 10 mm and 6 mm in diameter are used as time cathode and the anode respectively. The carbon tubule prepared is placed on the supporting grid substrate for an electron microscope which is placed in the vacuum evaporator. A resistance heating evaporation of naphthalene is carried out so that naphthalene is evaporated to a thickness of 50 nanometers. The carbon tubule is observed by the electron microscope to confirm that the carbon tubule is adhered on its top and side portions with particles of naphthalene, but no naphthalene exists within the carbon tubule. The supporting grid substrate is subjected to a heat treatment in the furnace at a temperature of 150° C. for 90 minutes in atmosphere. The carbon tubule subjected to the heat treatment is observed by the transmission electron microscope. Naphthalene is introduced through the top portion of the carbon tubule into the center hollow space of 20 nanometers in a diameter whereby it was confirmed that carbon tubule enclosing the naphthalene were prepared.

EXAMPLE 5

The nanometer sized carbon tubule according to the present invention is prepared in a helium atmosphere of 500 Torr with a discharge at a direct current of 20 V in which carbon sticks of 10 mm and 6 mm in diameter are used as the cathode and the anode respectively. The carbon tubule prepared is placed on the supporting grid substrate for an electron microscope which is placed in the vacuum evaporator. An electron beam evaporation of hydrogen fluoride is carried out at an evaporation ratio of 5 angstroms per second so that hydrogen fluoride is evaporated to a thickness of 50 nanometers. The carbon tubule is observed by the electron microscope to confirm that the carbon tubule is adhered on its top and side portions with particles of hydrogen fluoride, but no hydrogen fluoride exists within the carbon tubule. The supporting grid substrate is placed in contact with hydrogen fluoride at a temperature of 100° C. for 120 minutes. The carbon tubule subjected to the heat treatment is observed by the transmission electron microscope. Hydrogen fluoride is introduced through the top portion of the carbon tubule into the center hollow space of 20 nanometers in a diameter whereby it was confirmed that carbon tubule enclosing the hydrogen fluoride were prepared.

EXAMPLE 7

The nanometer sized carbon tubule according to the present invention is prepared by arc discharging apparatus provided with sodium, since sodium is readily reactive with oxygen in atmosphere. The cathode and the anode are applied with a direct high voltage for 5 seconds so that a corona discharge is caused between the carbon tubule and the electrode. The carbon tubule prepared is placed on the supporting grid substrate for an electron microscope which is placed in the vacuum evaporator. A resistance heating evaporation of sodium is carried out so that sodium is evaporated to a thickness of 50 nanometers. The supporting grid substrate is subjected to a heat treatment in the furnace at a temperature of 150° C. for 30 minutes in argon atmosphere. The carbon tubule subjected to the heat treatment is observed by the transmission electron microscope. Sodium is introduced through the top portion of the carbon tubule into the center hollow space of 20 nanometers in the diameter whereby it was confirmed that carbon tubules enclosing the sodium were prepared.

EXAMPLE 8

The carbon tubule comprises plural graphite tubular sheets having no defect which comprise the complete crystal structure of the six membered rings of carbon or the hexagonal atomic structure except at the top portion of the carbon tubule. In the nanometer sized carbon tubule having a relatively small internal diameter, dangling bonds are projected in a direction of the internal diameter due to pi-orbit of carbon atom. The atomic structure of the inner wall of the carbon tubule is constructed by such a sp3 bond as appearing in diamond rather than a sp2 bond as appearing in graphite. The dangling bonds on the inner wall of the carbon tubule serve as adhesion site for unstable gas molecules and as a catalyst for a decomposition of the molecules. A suitable gas for forming semiconductor is introduced into the interior of the carbon tubule so that decomposition is promoted. The gas molecules as the foreign material are decomposed and adhered on the inner wall of the carbon tubule. The adhered molecules are arranged according to the shape of the carbon tubule. A maximum diameter of the deposited semiconductor, a uniformity of the diameter and an accuracy thereof depend upon a completeness of the inner wall of the carbon tubule, for which reason a nanometer sized semiconductor is formed according to the internal shape of the carbon tubule.

The description will be directed to an example of a nanometer sized carbon tubule enclosing a silicon crystal. A nanometer sized carbon tubule is prepared in a helium atmosphere at 500 Torr by a discharge of a direct voltage of 20 V in which carbon sticks of 10 mm and 6 mm in diameter are used as the cathode and the anode respectively. Carbon is deposited on the cathode. A carbon tubule is picked up from a center portion of the carbon deposition at a yield of about 30%. The prepared carbon tubule has a internal diameter of about 2 nanometers. The nanometer sized carbon tubule is placed in a furnace. An exhaust is accomplished by a vacuum pump up to a pressure of $10^{-7}$ Torr. After that, a hydrogen gas is introduced into the furnace until the pressure becomes 1 Torr. The interior of the furnace is maintained at a temperature of 1000° C. for 2 minutes. The gas in the interior of the furnace is exhausted by the vacuum pump up to a pressure of $10^{-7}$ Torr. The interior of the furnace is maintained at a temperature of 750° C. and disilane is introduced thereinto until the pressure becomes 50 Torr for a heat treatment for 30 minutes. A treatment using hydrogen is accomplished to form an opening at a top portion of the carbon tubule. The disilane is introduced through the opening into the carbon tubule and then is subjected to a thermal decomposition to be made into a silicon crystal. Although the hydrogen molecules are used to form the opening, hydrogen atoms much more active may be used so that a heat treatment at much less than 1000° C. is required. The decomposition of the disilane generates hydrogen which is removed from the top and side portions of the carbon tubule. Then, after the above treatment, the silicon only remains in the interior of the carbon tubule. A one dimensional fine fiber of silicon semiconductor is formed in the interior of the carbon tubule in which a diameter of the one dimensional fine fiber is defined by the internal diameter of the carbon tubule. The prepared carbon tubule is observed by the transmission electron microscope to confirm that the silicon exists only within the most inner tubular sheet or the center hollow space of the carbon tubule. The silicon involved in the carbon tubule has a lattice constant slightly larger than that of a three dimensional bulk of silicon as a distance between the dangling bonds changes the lattice constant of the silicon crystal.

A plurality of the nanometer sized carbon tubules enclosing the silicon fine fibers are assembled to be excited by a argon ion laser beam whose wavelength is 5145 angstroms whereby an emission of a strong infrared light appears. The normal three dimensional bulk silicon is the indirect semiconductor having an energy band gap structure which forbids any light emission caused by a transition. The one dimensional silicon fine fiber breaks such forbidden principal to permit a light emission caused by the transition. The crystal structure and the lattice constant, both of which are different from those of the three dimensional silicon bulk seem to promote the break of the forbidden principal.

EXAMPLE 9

A nanometer sized carbon tubule is prepared in a helium atmosphere at 500 Torr by a discharge of a direct voltage of 20 V in which carbon sticks of 10 mm and 6 mm in diameter are used as the cathode and the anode respectively. Carbon is deposited on the cathode. A carbon tubule is picked up from a center portion of the carbon deposition at a yield of about 30%. The prepared carbon tubule has an internal diameter of about 2 nanometers. The nanometer sized carbon tubule is placed in the furnace. An exhaust is accomplished by a vacuum pump up to a pressure of $10^{-6}$ Torr. After that, a hydrogen gas is introduced into the furnace until the pressure becomes 1 Torr. The interior of the furnace is maintained at a temperature of 1000° C. for 2 minutes. The gas in the interior of the furnace is exhausted by the vacuum pump up to a pressure of $10^{-6}$ Torr. The carbon tubule is heated to be maintained at a temperature of 620° C. Triethyl gallium and arsine are introduced thereinto through individual ports at a theoretical ratio of triethyl gallium to arsine of 1:3 until the pressure becomes 50 Torr for a heat treatment for 20 minutes. A gallium fluoride is introduced through the opening into the carbon tubule. A one dimensional fine fiber of gallium fluoride is formed in the interior of the carbon tubule in which the diameter of the one dimensional fine fiber is defined by the internal diameter of the carbon tubule. The prepared carbon tubule is observed by the transmission electron microscope to confirm that the gallium fluoride exists only within the most inner tubular sheet or the center hollow space of the carbon tubule. The gallium fluoride involved in the carbon tubule has a lattice constant larger by 5.65 angstroms than that of a three dimensional bulk of gallium fluoride as including methyl group or methane generated in the gas reaction.

EXAMPLE 10

A nanometer sized carbon tubule is prepared in a helium atmosphere at 500 Torr by a discharge of a direct voltage of 20 V in which carbon sticks of 10 mm and 6 mm in diameter are used as the cathode and the anode respectively. Carbon is deposited on the cathode. A carbon tubule is picked up from a center portion of the carbon deposition at a yield of about 30%. The prepared carbon tubule has an internal diameter of about 2 nanometers. The nanometer sized carbon tubule is placed in the furnace. An exhaust is accomplished by a vacuum pump up to a pressure of $10^{-6}$ Torr. After that, hydrogen gas is introduced into the furnace until the pressure becomes 1 Torr. The interior of the furnace is maintained at a temperature of 1000° C. for 2 minutes. The gas in the interior of the furnace is exhausted by the vacuum pump up to a pressure of $10^{-6}$ Torr. The carbon tubule is heated to be maintained at a temperature of 350° C. Triethyl gallium and arsine are introduced thereinto through individual ports at a theoretical ratio of triethyl gallium to arsine of 1:3 until the pressure becomes 50 Torr for a heat treatment for 20 minutes to cause a reaction of the carbon tubule and gallium fluoride. The heat treatment for the reaction is accomplished in cooperation with an irradiation of light having a wavelength of 210 nanometers. The light irradiation promotes the reaction at a relatively low temperature. As a result, gallium fluoride is introduced through the opening into the carbon tubule. A one dimensional fine fiber of gallium fluoride is formed in the interior of the carbon tubule in which a diameter of the one dimensional fine fiber is defined by the internal diameter of the carbon tubule. The prepared carbon tubule is observed by the transmission electron microscope to confirm that the gallium fluoride exists only within the most inner tubular sheet or the center hollow space of the carbon tubule.

EXAMPLE 11

The carbon tubule has an extremely high electrical conductivity in the axial direction as comprising the tubular graphite sheets which have a very high electrical conductivity. The completeness of the atomic structure of the carbon further contributes a remarkable increase of carrier mobility which provides the high electrical conductivity.

When a metal one dimensional fine fiber is formed in the interior of the carbon tubule, carriers are movable between the most inner tubular graphite sheet and a surface of the metal fine fiber. The movement of the carriers further improves a carrier concentration of the graphite sheet. The carriers of electrons or holes so produced as the above have the extremely high mobility due to the completeness of the atomic structure of the carbon crystal. The electrical conductivity of the carbon tubule is also extremely high as being defined by the product of the carrier concentration and the carrier mobility. The conventional wirings used for LSI circuits are made of aluminium and alloy thereof. A copper wiring has half the resistivity of aluminium. The carbon tubule enclosing copper according to the present invention has a very low electrical resisitivity one tenth that of conventional copper wiring.

Since the carbon tubule has such a very strong bond structure along the axial direction as that of diamond, almost no diffusion nor movement of the carbon atom as well as no break of carbon atomic structure appears due to a strain or a temperature under normal conditions. The carbon tubule with carriers has a much lower electrical resistivity than that of the center portion of the metal involved in the carbon tubule. The majority of the electrical currents flows on the carbon tubule. This prevents any heat generation due to a resistivity of the metal and also prevents any electromigration and stress migration.

Figure 2:
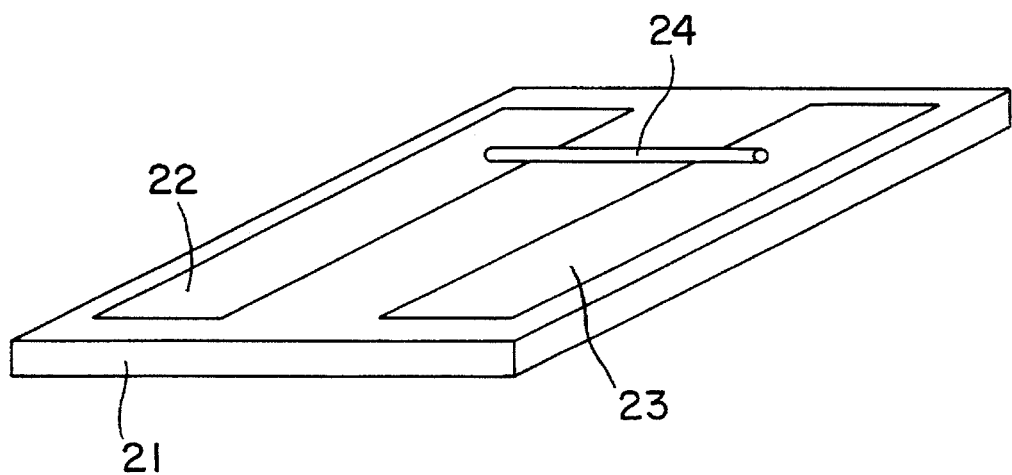
FIG. 2 is a perspective view illustrative of a carbon nanotubule enclosing a conductive material when used as a wire between electrodes on a substrate in a preferred embodiment according to the present invention.

FIG. 2 illustrates a nanometer sized carbon tubule 24 enclosing lead in which the carbon tubule 24 is arranged to provide contact between electrodes 22 and 23 made of lead provided on a substrate 21. The carbon tubule is prepared by use of arc discharge. The carbon tubule 24 has an internal diameter of 10 nanometers and an outer diameter of 15 nanometers. The lead electrodes 22 and 23 are so designed as sufficiently large to be contacted with an external measuring device. Actually, an organic solvent, in which the carbon tubules are dispersed, is applied on the substrate 21 provided with the lead electrodes 22 and 23 for a dry treatment thereof. The substrate 21 is then introduced in a vacuum scanning tunnel microscope. The carbon tubule 24 is moved to be positioned at a predetermined position by a movement of a probe of the scanning tunnel microscope and an application of the field. The substrate 21 is subsequently placed in a vacuum heating device. Oxygen is introduced into the vacuum heating device until a pressure of the interior of the device becomes 10 Torr for a subsequent heat treatment at a temperature of 300° C. for 2 minutes. After that, the interior gas in the device is vacuumed for a subsequent heat treatment at a temperature of 350° C. for 20 minutes thereby the leads on the lead electrodes 22 and 23 are melted and introduced into the interior of the carbon tubule 24. The temperature is lowered to room temperature so that the melted lead in the carbon tubule is made into a solid state and the lead electrodes 22 and 23 are electrically connected through the carbon tubule enclosing the lead having an extremely high electrical conductivity. In the above processes, an oxygen gas is used to form an opening at the top portion of the carbon tubule. Alternatively, ozone, which is much more active, is useful so that a required temperature of a heat treatment to form the opening is low.

The resistance between the electrodes of the circuits is the same as that of aluminium electrodes of a width of 1000 angstroms when evaporated on the substrate. Since the diameter of the nanometer sized carbon tubule is smaller by one order as compared to that of the aluminium, the resistivity of the carbon tubule enclosing the lead is very small as compared to that of the aluminium. In the above carbon tubule involving the lead, no deterioration of the resistivity due to a current application of a large current density appears. A temperature of the carbon tubule is lowered down to a liquid helium temperature of 4.2 K whereby the resistivity thereof is rapidly dropped down so that the lead becomes a superconductor.

EXAMPLE 12

The internal diameter of the nanometer sized carbon tubule is very small, for example, 5 to 10 manometers only, which is much smaller than a magnetic domain of the normal magnetic material. The nanometer sized carbon tubule enclosing a magnetic material may be regarded as a single magnetic domain fine particle. No movement of the magnetic domain appears in magnetization thereby a large holding force is obtained.

When the nanometer sized carbon tubules are arranged in array on e substrate in which the axial direction of the carbon tubules is vertical to the substrate. An extremely high density vertical magnetic recording medium is formed due to its anisotropy. If the internal diameter of the carbon tubule is 1 to 2 nanometers, a spin of the magnetic element receives a thermal disturbance so that the magnetic material is made into a super paramagnetism. As a result, the holding force is lost. It is thus preferable to use the carbon tubule having an internal diameter of about 10 nanometers when used as the magnetic recording material.

Figure 3:
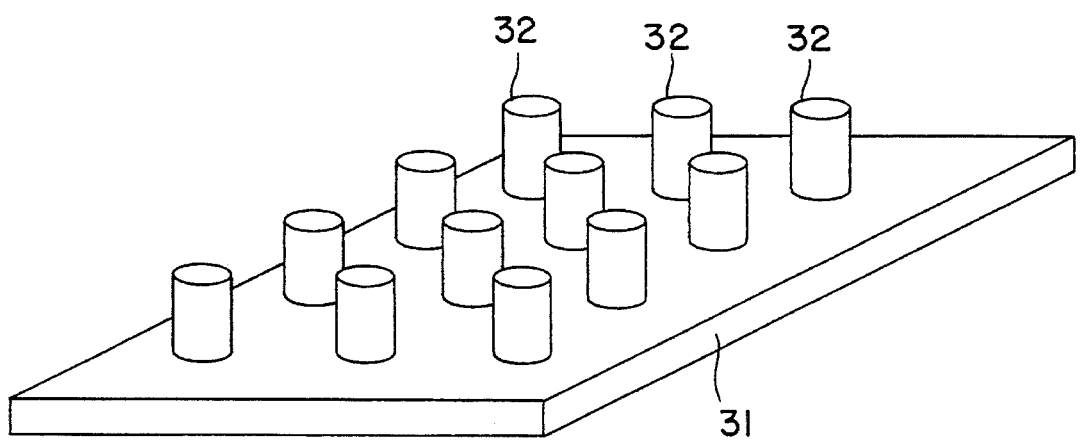
FIG. 3 is a perspective view illustrative of carbon nanotubule enclosing a magnetic material when arranged in array on a substrate in a preferred embodiment according to the present invention.

As shown in FIG. 3, nanometer sized carbon tubules 32 enclosing gadolinium and cobalt are arranged in array on a glass substrate 31 in which the axial direction of the carbon tubules 32 is vertical to a surface of the glass substrate 31. The glass substrate 31 provided with the carbon tubules 32 constitutes a magnetic thin film. Gadolinium is evaporated on the carbon tubule for a subsequent heat treatment at a temperature of 1350° C. Cobalt is subsequently evaporated on the carbon tubules for a subsequent heat treatment at a temperature of 1600° C. The carbon tubules are subjected to a centrifugal separation so that some of the carbon tubules having a predetermined weight is separated to be diffused in an organic solvent. A magnetic field is applied on the glass substrate 31 for an application of the solvent including the carbon tubules 32 enclosing the magnetic material on the glass substrate 31 and a subsequent dry treatment thereof. According to the above processes, the magnetic thin film is prepared. The magnetization of the magnetic thin film is measured and confirmed to be two times that of normal GdCo$_2$.

What is claimed is:

1. A carbon tubule of a nanometer size in diameter which comprises:

a plurality of tubular monoatomic graphite sheets coaxially arranged; and a foreign material enclosed in a center hollow space which is defined by an internal surface of the most inner tubular monoatomic graphite sheet, said foreign material being a metal selected from the group consisting of lead, tin, copper, indium, mercury and alkali metals.

2. A carbon tubule as claimed in claim 1, wherein said foreign material is an alkali metal.

* * * * *